July 24, 1923.

M. J. B. BARBAROU 1,462,783

STOPPER FOR RESERVOIRS, RADIATORS, AND THE LIKE

Filed April 28, 1921    2 Sheets-Sheet 1

INVENTOR:
Marius Jean Baptiste Barbarou

By Otto Munk his ATTORNEY.

July 24, 1923.

M. J. B. BARBAROU 1,462,783

STOPPER FOR RESERVOIRS, RADIATORS, AND THE LIKE

Filed April 28, 1921  2 Sheets-Sheet 2

INVENTOR:
Marius Jean Baptiste Barbarou.

By *Otto Munk*.

his ATTORNEY.

Patented July 24, 1923.

1,462,783

UNITED STATES PATENT OFFICE.

MARIUS JEAN BAPTISTE BARBAROU, OF PARIS, FRANCE.

STOPPER FOR RESERVOIRS, RADIATORS, AND THE LIKE.

Application filed April 23, 1921. Serial No. 465,279.

*To all whom it may concern:*

Be it known that I, MARIUS JEAN BAPTISTE BARBAROU, citizen of the French Republic, residing at Paris, in the Republic of France, have invented new and useful Improvements in Stoppers for Reservoirs, Radiators, and the like, of which the following is a specification.

This invention has for its object a stopper for reservoirs, radiators etc., used on motor or like vehicles which comprises a pivoted cover adapted to have a tight fit upon the orifice to be closed and a pivoted cap provided with a flange adapted to come into engagement with a fixed part of the device, said cap being also provided with a set screw for securely holding the cover in position.

In the accompanying drawing and by way of example:

Figure 1:
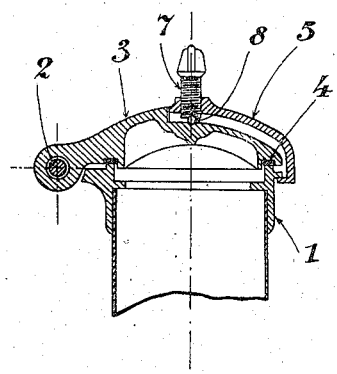
Fig. 1 is a vertical section on the line A—A (Fig. 2) of a stopper, according to the invention.
Figure 3:
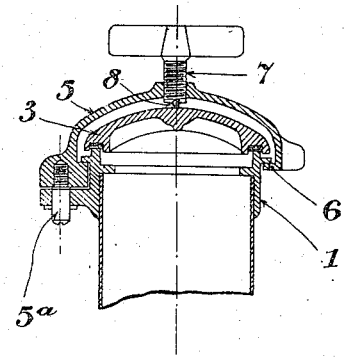
Fig. 3 is a second vertical section on the line B—B (Fig. 4) and at 90° from the first.
Figures 2, 4:
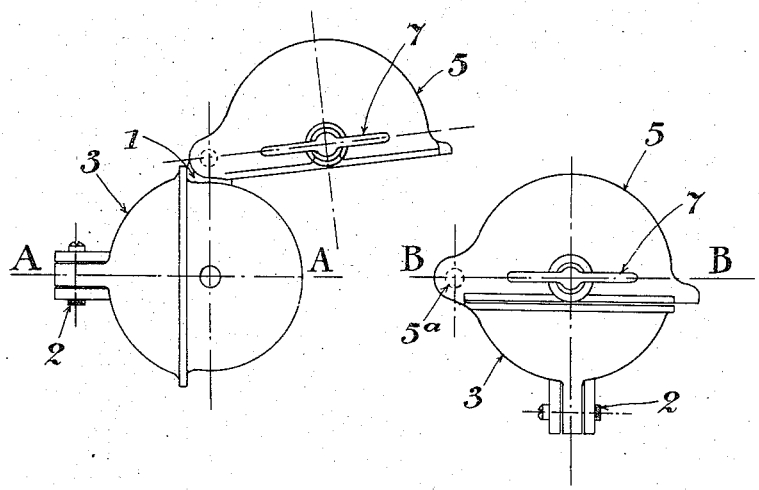
Fig. 2 is a corresponding plan view, with the cap open.
Fig. 4 is a second corresponding plan view, with the cap closed.

A cast piece 1 forming a socket or sleeve is permanently secured by riveting, soldering or welding to a neck forming part of the reservoir. This socket carries a hinge 2 having a horizontal axis, upon which is pivoted a cover 3 provided with a groove 4 filled with a plastic substance, which forms a tight joint with the socket 1.

A cap 5 is pivoted by a stud shaft $5^a$ having a vertical axis upon the socket 1 and may come above a part of the cover 3. This cap 5 is provided with a flange 6 which passes below a ring forming part of the socket 1. The cap 5 also carries at the top a screw 7 which through the intermediary of a ball 8 strongly presses the cover 3 upon its seat, thus securing a suitably tight fit.

Figure 5:
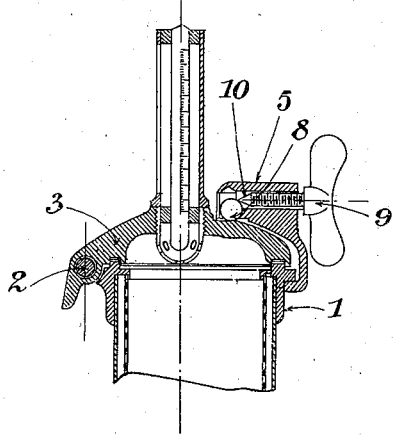
Fig. 5 is a vertical section on the line C—C (Fig. 6) of a modified form of stopper according to the invention.
Figure 7:
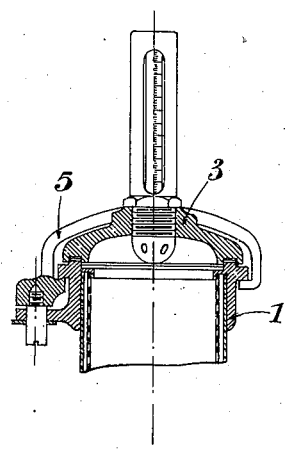
Fig. 7 is a second vertical section on the line D—D (Fig. 8) and at 90° from the first.
Figure 6:
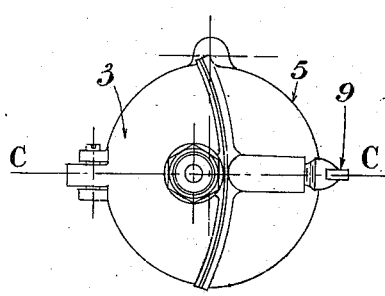
Fig. 6 is a corresponding plan view.
Figure 8:
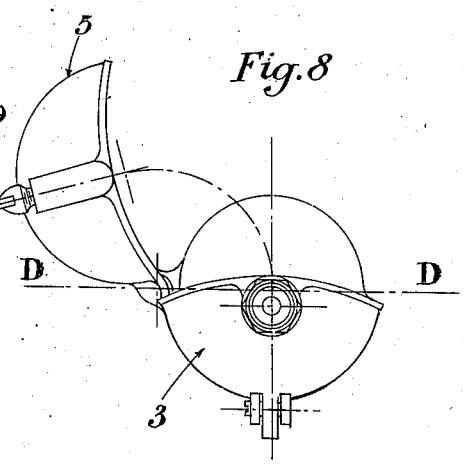
Fig. 8 is a corresponding plan view, with the cap open.

In the construction shown in Figs. 5 to 8, the cap 5 also presses the cover 3 through the intermediary of a ball 8. The ball 8 being pressed by a screw 9 with horizontal axis, terminated by a cone 10 at its end; this disposition permits of placing any piece upon the cover, for instance a thermometer permitting the driver of the vehicle to observe the temperature of his radiator; since the stopper always extends in the same direction, the thermometer may be permanently secured in place and the operations of opening and closing the reservoir will not change the direction thereof at the moment of closing the cover.

Having now described my invention, what I claim as new and desire to secure by Letters Patent is:

1. A stopper for reservoirs, radiators, etc., comprising a pivoted cover adapted to have a tight fit upon the orifice to be closed, a fixed part, a cap pivoted to said fixed part, a flange on said cap adapted to come into engagement with said fixed part and a set screw on the cap adapted to tighten the cover in position.

2. A stopper for reservoirs, radiators, etc., comprising a supporting sleeve adaped to be secured on the neck of the reservoir or like apparatus a fixed part integral with said supporting sleeve, a cover pivoted about a horizontal axis on said sleeve and adapted to have a tight fit upon the end of said neck, a cap pivoted about a vertical axis on said sleeve, a flange on said cap adapted to come into engagement with said fixed part and a set screw on the cap, adapted to tighten the cover in position.

3. A stopper for reservoirs, radiators, etc., comprising a supporting sleeve adapted to be secured on the neck of the reservoir or like apparatus a fixed part integral with said supporting sleeve, a cover pivoted about a horizontal axis on said sleeve and adapted to have a tight fit upon the end of said neck, said cover having a part of reduced height forming a shoulder, a cap pivoted about a vertical axis on said sleeve and adapted to be brought above the part of reduced height of the cover, whereby the cap may abut against the said shoulder in its closing position, and its upper face may come substantially flush with that of the cover in the closed position, a flange on said cap, adapted to come into engagement with said fixed part and a set screw on the cap, adapted to tighten the cover in position.

4. A stopper for reservoirs, radiators, etc., comprising a supporting sleeve adapted to be secured on the neck of the reservoir or like apparatus, a fixed part integral with said supporting sleeve, a cover pivoted about a horizontal axis on said sleeve and adapted to have a tight fit upon the end of said neck, a cap pivoted about a vertical axis on said sleeve, a flange on said cap, adapted to come into engagement with said fixed part, a set screw placed horizontally on the cap at one side of the stopper and having a conical end, a ball in contact with the cover and adapted to cooperate with said conical end and a thermometer mounted on the central part of the cover, substantially as described.

In testimony whereof I have signed my name to this specification.

MARIUS JEAN BAPTISTE BARBAROU.